Patented June 11, 1940

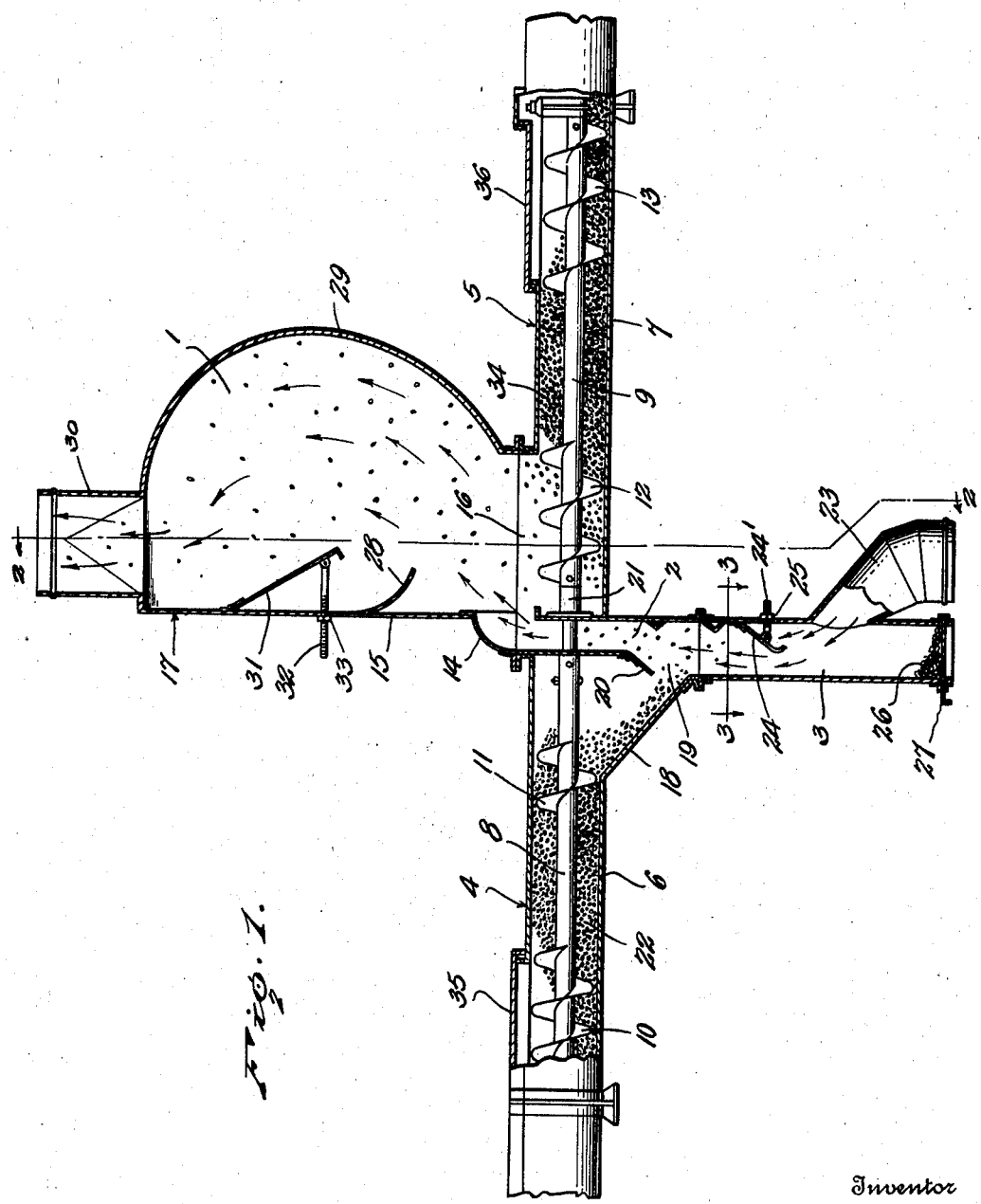

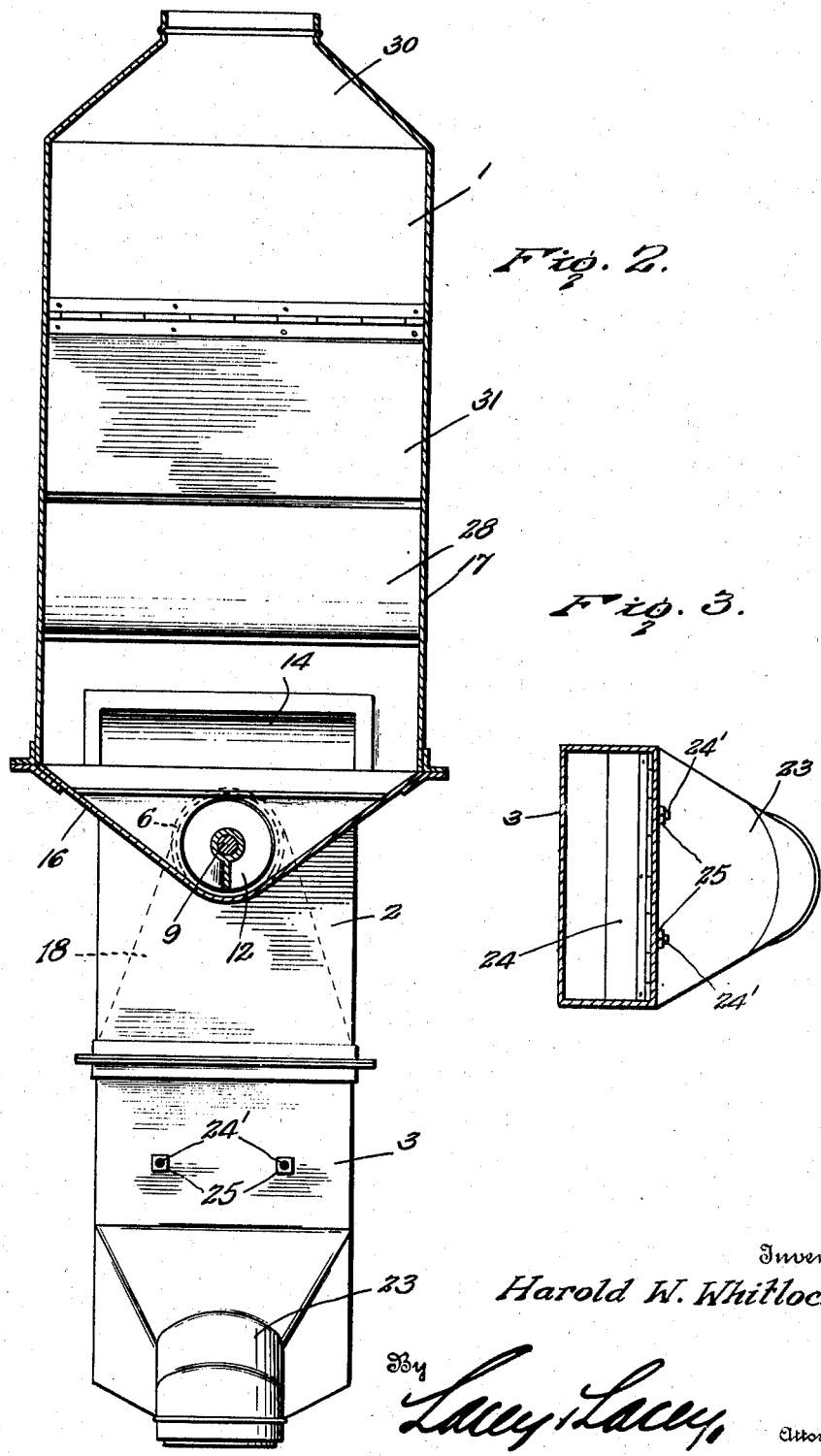

2,204,032

UNITED STATES PATENT OFFICE 2,204,032

SEED CLEANER

Harold W. Whitlock, Oklahoma City, Okla., assignor to The Boardman Company, Oklahoma City, Okla., a corporation of Delaware Application August 2, 1937, Serial No. 157,009

1 Claim. (Cl. 209—139)

This invention relates to a seed cleaner and one object of the invention is to provide a cleaner of such construction that seed may be thoroughly cleaned by the action of an air blast which is strong enough to carry seed and light matter into a separating chamber where the light matter will be carried off from the seed but at the same time not sufficiently strong to carry heavy foreign matter upwardly into the chamber. It will thus be seen that the heavy foreign matter can drop down into a compartment provided to receive the same while the seed and light material are carried upwardly to a chamber where the light matter will be driven off and the seed accumulate in the bottom thereof for removal.

Another object of the invention is to provide a seed cleaner wherein the seed in its initial condition and also the cleaned seed are moved by screw conveyors which are so formed that, while the seed will be progressively fed into the air blast and the cleaned seed progressively moved outwardly, masses of seed will be formed and serve as barriers preventing improper passage of air through the cleaner.

Another object of the invention is to so construct the cleaner that the seed in its initial condition and the cleaned seed may be moved through the cleaner without attention by an operator, thus making it necessary merely to see to it that a sufficient quantity of uncleaned seed is in a hopper from which it is delivered to the cleaning device and the cleaned seed taken care of.

Another object of the invention is to so feed the seed to the chamber or conduit through which the air blast passes that it will be fed into this chamber in a spread condition and thus permit the heavy foreign matter to easily fall to the bottom of the air chamber or conduit while the seed and light foreign matter are carried upwardly.

Another object of the invention is to provide the cleaner with a chamber to receive the seed and light foreign matter of such dimensions and formation that the current of air which carries the seed and light foreign matter into the chamber may be reduced to such velocity that the seed will drop through an outlet at the bottom of the chamber while the light foreign matter is carried off through a discharge passage at the top of the chamber.

It is another object of the invention to provide improved means for directing flow of air through the conduit at the separating chamber and cause the air to move in such a path that the separation of heavy and light foreign matter from the seed will be effectively carried out.

It is another object of the invention to provide a seed cleaner of the pneumatic type which is simple in construction and not liable to easily get out of order.

The invention is illustrated in the accompanying drawings, wherein

Figure 1 is a sectional view taken longitudinally through the cleaner,

Figure 2 is a view taken along the line 2—2 of Figure 1 and showing the cleaner partially in transverse section and partially in elevation, and Figure 3 is a sectional view taken along the line 3—3 of Figure 1.

This improved cleaner consists briefly of a separating chamber 1 in which light foreign matter is separated from seed, an air conduit 2 through which the seed and light foreign matter are delivered to the separating chamber 1, a chamber 3 constituting a receptacle for heavy foreign matter and also serving as a portion of the air conduit, feeding mechanism 4 for delivering the uncleaned seed into the air conduit, and delivery means 5 for delivering the cleaned seed from the separating chamber 1 to the place where it is to be shred or processed. The delivery mechanism and the discharge mechanism are in the form of conveyors having tubes 6 and 7 which are disposed in horizontal alinement with each other. Rotary shafts 8 and 9 extend axially through the tubes 6 and 7 and carry spirally formed conveyor blades 10, 11, 12 and 13, and attention is called to the fact that the blade 11 is spaced from the blade 10 quite a distance and also the blade 13 is spaced from the blade 12 quite a distance. The conduit or air tube 2 extends vertically through space between adjoining ends of the tubes 6 and 7 in blocking relation thereto and at its upper end is provided with a neck or mouth 14 which opens into the separating chamber 1 through the lower end of the flat front wall 15 thereof. The casing defining the separating chamber 1 is open at its bottom, and upon referring to Figure 2, it will be seen that the forward end portion of the tube 7 which is directly below the lower end of the separating chamber is widened, as shown at 16, to provide a mouth about which the lower end of the casing 17 of the separating chamber is secured. The rear end of the tube 6 adjoining the conduit 2 is also widened but its widened portion extends downwardly instead of upwardly and defines a spout 18 corresponding in width to the width of the conduit or air tube 2 and the refuse receptacle 3. The lower wall of this spout or chute 18 is flat throughout its width and extends downwardly at such an incline that seed and foreign matter mixed therewith will easily flow along this trough and through an opening 19 into the air passage. A baffle 20 is hinged along its upper edge at the top of the passage or inlet 19 and when properly set will direct movement of the seed through the inlet and into the air passage. A coupling 21 is provided between adjacent ends of the shafts 8 and 9 and is journaled through the air passage with one end secured in a pocket formed in the shaft 9 and its other end secured in a pocket formed in the shaft 8.

When this seed cleaner is in use, seed is fed into the conveyor tube 6 from a hopper or other suitable source of supply (not shown) and is moved longitudinally through this conveyor tube by the screw conveyor 10. When the seed reaches the end of the screw conveyor 10, it will be urged forwardly towards the screw conveyor 11 and a mass of seed will be packed into the conveyor tube, as shown at 22, to form a plug which is gradually moved through the conveyor tube and at one end broken up by the screw conveyor 11 which feeds the seed to the spout or trough 18. The seed will flow downwardly along the bottom of this spout or trough and spread out across the same so that upon reaching the inlet 19 the seed will be flowing into the air passage in the form of a curtain. Air passes upwardly through the air passage from the spout 23 which is connected with a suitable source of air under pressure, and upon referring to Figures 1 and 2, it will be seen that this spout 23 is disposed at an upward incline and is of a width corresponding to the width of the lower portion 3 of the conduit 2. A deflector plate 24 is hingedly mounted in the conduit above the air nozzle 23 and is provided with threaded stems 24' which pass through the wall of the air conduit to which the plate is hinged and by adjusting the nut 25 the deflector plate may be disposed at such an angle that the upwardly moving current of air will be directed toward the opposite wall of the conduit and then pass upwardly through the depending curtain of seed. The force of the air will be sufficient to carry the seed and light foreign matter upwardly through the air conduit, but nails, stones and other heavy foreign matter will drop and accumulate at the bottom of the air conduit, as shown at 26, where it will be retained until the closure 27 is removed and this trash permitted to drop into a receptacle placed under the lower end of the conduit. The plate 20 has a tendency to direct the upwardly moving current of air and the seed and light foreign matter through the conduit 2 and the fact that the space in the conduit tube 6 is blocked by the mass of seed 22 will serve to prevent escape of air from the conduit 2 except through the open upper end thereof. By having the upper end of the air conduit formed with a curved mouth the seed and light foreign matter will be directed to the separating chamber 1 and across the same over the mouth 16 of the conveyor tube 7. A deflector 28 which extends inwardly from the wall of the casing above the mouth 14 serves to assist in directing the air and seed across the separating chamber towards the wall 29 which is arcuate vertically so that a swirling motion will be imparted to the air as it moves upwardly in the separating chamber towards the discharge neck 30. In view of the fact that the casing defining the separating chamber is of large capacity, the incoming air and seed will spread out in the separating chamber and the velocity of the air will be reduced to such an extent that, while it may still carry the light foreign matter upwardly through the discharge neck, the seed will drop downwardly and into the mouth 16 of the conveyor tube 7. A deflector plate 31 is hinged to the front wall 15 of the casing above the deflector 28 and provided with stems 32 corresponding to the stems 24' of the plate 24 and engaged by nuts 33 so that this deflector plate may be disposed at the proper angle to guide falling seed away from the wall 15 to such a position that they will drop into the mouth 16. The screw conveyor 12 operates in the mouth 16 and moves the seed through the conveyor tube 7 towards the screw conveyor 13, but since the screw conveyors 12 and 13 are spaced from each other a mass of seed will accumulate in the conveyor tube between the screw conveyors, as shown at 34, and thus constitute a barrier which will prevent escape of air from the casing through the mouth 16. This mass of seed will be urged through the conveyor tube by the screw conveyor 12 and the screw conveyor 13 will break up the mass of seed and carry the seed through the conveyor tube to a suitable destination where it is to be stored or packed. It will thus be seen that during passage of the seed through the seed cleaner the heavy foreign matter will first be separated from the seed and dropped down into the lower end of the lower section of the air conduit and the seed and light foreign matter which may be lint or the like carried upwardly through the air conduit into the separating chamber where the light foreign matter will be carried off through the discharge neck 30 and the seed drop into the mouth of the conveyor tube 7 through which it will be moved by the screw conveyors 12 and 13. Clean-out openings which are normally closed by covers 35 and 36 are provided above the screw conveyors 10 and 13 in order that access may be had to these screw conveyors in case cleaning is necesary.

Having thus described the invention, what is claimed as new is:

A seed cleaner comprising a separating chamber provided with a seed outlet at its bottom and an outlet at its top for air and light foreign matter, a conduit disposed vertically and having a mouth at its upper end communicating with the lower portion of the separating chamber and curved toward the same for directing air laden with seed and light foreign matter into the separating chamber, the wall of the chamber at the opposite side of the separating chamber from the air inlet being arcuate vertically and bowed outwardly between the seed outlet and the air outlet for imparting a whirling motion about a horizontal axis to upwardly moving air and causing seed to drop downwardly and through the seed outlet of the chamber while the air and light foreign matter pass upwardly through the air outlet, means at the other side of the chamber from the arcuate wall extending at an incline therefrom intermediate the height thereof for directing upwardly moving air and seed towards the arcuate wall and directing moving seed towards the seed outlet, means for delivering uncleaned seed into the air conduit intermediate the height thereof, means for delivering air into the air conduit below the seed inlet thereof whereby a blast of air moves upwardly through the conduit to carry seed and light foreign matter into the separating chamber while heavy foreign matter drops downwardly through the air conduit, and means for conveying clean seed away from the seed outlet of the chamber, said second and fourth mentioned means comprising longitudinally alined conveyor tubes, shafts in the tubes and being longitudinally alined, said shafts rotating as a unit, and spirally arranged blades on each of the shafts.

HAROLD W. WHITLOCK.